United States Patent [19]

Ball et al.

[11] Patent Number: 5,160,819
[45] Date of Patent: Nov. 3, 1992

[54] MICROWAVE TUNNEL OVEN HAVING MEANS FOR GENERATING HIGHER ORDER MODES IN LOADS

[75] Inventors: Melville D. Ball; Christine E. Gallerneault; Bryan C. Hewitt; Claude P. Lorenson, all of Kingston, Canada

[73] Assignee: Alcan International Limited, Montreal, Canada

[21] Appl. No.: 667,756

[22] Filed: Mar. 11, 1991

[51] Int. Cl.⁵ .............................................. H05B 6/78
[52] U.S. Cl. ...................... 219/10.55 A; 219/10.55 F; 99/DIG. 14; 99/451; 426/243
[58] Field of Search ................. 219/10.55 A, 10.55 F, 219/10.55 E; 426/241, 243, 234; 99/DIG. 14, 451

[56] References Cited

U.S. PATENT DOCUMENTS

| | | | |
|---|---|---|---|
| 3,974,353 | 8/1976 | Goltsos | 219/10.55 A |
| 4,771,155 | 9/1988 | Yangas | 219/10.55 F |
| 4,814,568 | 3/1989 | Keefer | 219/10.55 E |
| 4,831,224 | 5/1989 | Keefer | 219/10.55 F |
| 4,839,485 | 6/1989 | Koch et al. | 219/10.55 A |
| 4,866,234 | 9/1989 | Keefer | 219/10.55 E |
| 4,877,933 | 10/1989 | Yangas | 219/10.55 F |
| 4,888,459 | 12/1989 | Keefer | 219/10.55 E |
| 4,889,966 | 12/1989 | Meredith | 219/10.55 F |
| 4,896,005 | 1/1990 | Skubich | 219/10.55 A |
| 4,992,638 | 2/1991 | Hewitt et al. | 219/10.55 E |

FOREIGN PATENT DOCUMENTS

| | | |
|---|---|---|
| 0317203 | 5/1989 | . |
| 0350564 | 1/1990 | European Pat. Off. . |
| 0351491 | 1/1990 | European Pat. Off. . |
| 0382399 | 8/1990 | European Pat. Off. . |
| 3447544 | 7/1986 | Fed. Rep. of Germany . |
| 62239973 | 10/1987 | Japan . |

Primary Examiner—Philip H. Leung
Attorney, Agent, or Firm—Cooper & Dunham

[57] ABSTRACT

A microwave tunnel oven receives a series of packages each comprising a container and a load in the container to be heated by microwave energy. The oven has a conveyor with a series of carriers each for receiving one of the packages and conveying it through the oven. The improvement comprises modifying the microwave field in the load during its irradiation in the oven in a manner to generate higher order modes of microwave energy in the load to enhance the uniformity of heating throughout the load. The structure for achieving the field modification is divided into two parts, one part being formed on the conveyor and the other part being formed either on the package or on a subsidiary conveyor that extends parallel to the main conveyor.

19 Claims, 3 Drawing Sheets

MICROWAVE TUNNEL OVEN HAVING MEANS FOR GENERATING HIGHER ORDER MODES IN LOADS

FIELD OF THE INVENTION

The invention relates to the industrial processing of products using microwave heating, and more specifically to an improved microwave tunnel oven for heating loads with better uniformity of heating throughout the loads.

While the description below deals with use of the invention for heating foodstuffs, since this is its major use, the invention can also be used for heating, e.g. sterilizing, pharmaceutical products, or for heating any other product in which there is a need for a continuous process that will ensure uniformity of heating.

BACKGROUND OF THE INVENTION

The use of microwave heating in industrial processing of food has been undergoing development for the last 15 years. The two processes of main interest are pasteurization and sterilization. In each case the objectives have been to develop continuous processes that can reduce energy consumption and improve the product quality, while maintaining microbiological integrity. Microwave sterilization is a comparatively long term objective due to the difficult engineering required to handle the higher temperatures and pressures, and the fact that the sterilization process is subject to very stringent regulatory requirements and process acceptance. As a result, it is the comparatively simpler pasteurization process that is mainly of immediate interest to the food industry. Microwave pasteurization of breads and pastas has been in use in Europe for several years and there is a desire to extend the process to other food products.

The objective is to attain a pasteurization temperature, e.g. 70°-90° C., as quickly as possible and to reduce the time of holding at this temperature, while maintaining quality, i.e. avoiding degradation and ensuring microbiological safety. Non-uniform heating has been the major obstacle to be overcome in the achievement of microwave pasteurization.

PRIOR ART

Current technology requires expensive and sophisticated engineering of the microwave system. For example, it is known to employ a series of computer controlled applicators that deliver different amounts of microwave energy to food loads in pre-packaged trays travelling through a treatment tunnel equipped with microwave radiators, the purpose of such control being to avoid edge heating of the loads. See, for example, European patent application of C. Ferrari published Jan. 17, 1990 under No. 350,564; European application of O. Caselli published Jan. 24, 1990 under No. 351,491; U.S. Pat. No. 4,889,966 of R. J. Meredith issued Dec. 26, 1989; U.S. Pat. No. 4,896,005 of R. Skubich issued Jan. 23, 1990; and U.S. Pat. No. 4,839,485 of K. Koch et al issued Jun. 13, 1989.

In one prior art system it is required that the product be uniformly heated to 60° C. in a conventional hot air oven before entering the microwave tunnel.

It is also known to use focusing bars in a microwave tunnel oven, and multiple passes through the tunnel. These systems requires reconfiguration to accommodate different products and/or packages.

Many of the existing systems use a combination of conventional and microwave ovens with complex microwave energy applicators to try to optimize uniformity of heating. By reason of their complexity, these systems are best suited to large scale production of extended shelf life, single product items, such as pastas and breads. The application of this technology to other food products requires additional considerations. The limited shelf life, multi-component products are generally produced in small volumes of many different foodstuffs, and inventories cannot be allowed to build up excessively. These products thus introduce a requirement for a small scale, flexible system capable of rapid response to changing requirements. Furthermore, it is more difficult to achieve the desired degree of uniformity of heating in products of this type.

SUMMARY OF THE INVENTION

An object of the present invention is to provide an improved form of microwave tunnel oven that is simpler than those hitherto used or proposed, while at the same time furnishing improved results in respect of enhancement of the heating of the loads, and preferably an enhancement of the uniformity of such heating.

According to the invention, these objectives are achieved by adapting the microwave tunnel oven technology to take advantage of the various methods of improving the heating of loads in individual packets, that have been developed to facilitate the heating and/or cooking of refrigerated and/or frozen foods by consumers in domestic microwave ovens.

In this connection, reference is made to U.S. Pat. No. 4,866,234 of Richard M. Keefer issued Sep. 12, 1989, which discloses a container in which a load is to be heated, a part of this container, e.g. the bottom, or a lid, or both, being fitted with an array of either one or more conducting plates distributed across a microwave-transparent substrate, or, conversely, an array of one or more microwave-transparent gaps in a microwave-opaque substrate. This container achieves an improved uniformity of heating in the load by modifying the microwave field in the load by generating modes of microwave energy that are of a higher order than the fundamental mode or modes that would propagate in the load as a result of the dimensions of the load and/or the container in the absence of the field modification. In some instances, some relatively weak higher order modes may already exist, in which case the effect of the field modifying arrays mentioned above will be to enhance the strength of such higher order modes to the point where they play a significant role in the absorption of microwave energy by the load. For this reason, references herein to "generating higher order modes" or the equivalent, are intended to include not only the generation of higher order modes where none previously existed but also the enhancement of any weak or incipient higher order modes that may be present. The reason why higher order modes achieve improved uniformity of heating in the load can be explained in a somewhat simplified manner as resulting from the fact that higher order modes decrease the periodicity between high field regions. This means that the hot spots are closer together and more easily merged over short time periods by normal heat transfer.

Various other package structures can be employed to achieve the generation of higher order modes. See, for example, U.S. Pat. No. 4,831,224 of Richard M. Keefer issued May 16, 1989, and U.S. Pat. No. 4,888,459 of Richard M. Keefer issued Dec. 19, 1989, which disclose stepped structures that protrude into or out of the container from one of its surfaces, usually the bottom or the lid, and container wall structures that comprises at least two wall portions of respectively different electrical thicknesses, i.e. different spatial thicknesses or different dielectric constants.

The generation of higher order modes in the horizontal plane is not the only form of microwave field modification that can be used to enhance heating uniformity. For example, Claude P. Lorenson et al U.S. Pat. No. 4,990,735 issued Feb. 5, 1991 discloses a container and load combination in which the depth of the load is so selected that the power absorbed by the load from a higher order mode is at or near a maximum value relative to that absorbed from the fundamental mode, while that absorbed from the fundamental mode is preferably at or near a minimum.

Still further techniques are known for modifying the microwave field for the purpose of enhancement of heating uniformity. See for example European patent application of Richard M. Keefer publication No. 317203, which discloses the combination of a load, a susceptor and field modifying means to achieve control of heating distribution.

Reference is also made to Richard M. Keefer U.S. Pat. No. 4,814,568 issued Mar. 21, 1989, which shows yet another container modification that can be used for the same purpose.

In addition it has been proposed in European patent application of Richard M. Keefer et al publication No. 382399, to generate higher order modes to achieve uniformity of heating across a main portion of a load while directing energy into a surface layer of the load in modes that are in cut-off in such layer to achieve a browning or crispening effect.

In the present invention, any of the various structures disclosed in the above patents and applications (all of which are hereby incorporated herein by reference), or similar or other structures that will achieve increased heating or an improvement in the uniformity of heating by field modification, e.g. by generating higher order modes, can be employed. The particular form of field modification means that is chosen in a particular situation will depend on the specific nature and/or dimensions of the load, as well as the type of heating to be applied to it, e.g., assuming that the load is a foodstuff, either pasteurization to produce shelf-stable meals that are sold refrigerated and in which over 99% of the bacteria are killed (which process calls for temperatures in the range of 70°–90° C.), or sterilization to produce products that are sold at ambient temperatures and in which the spores are also killed, which latter process calls for temperatures somewhat above 120° C., but not so high as to damage the product or render it unpalatable.

Thus the present invention in its broad aspect consists of the provision in association with a microwave tunnel oven of field modifying means that will generate higher order modes of microwave energy in a load travelling through such oven to enhance the uniformity of heating throughout the load.

The field modifying means may be provided entirely in the oven, or partly in the oven and partly in the package containing the food.

DETAILED DESCRIPTION OF THE PREFERRED EMBODIMENTS

Figure 1:
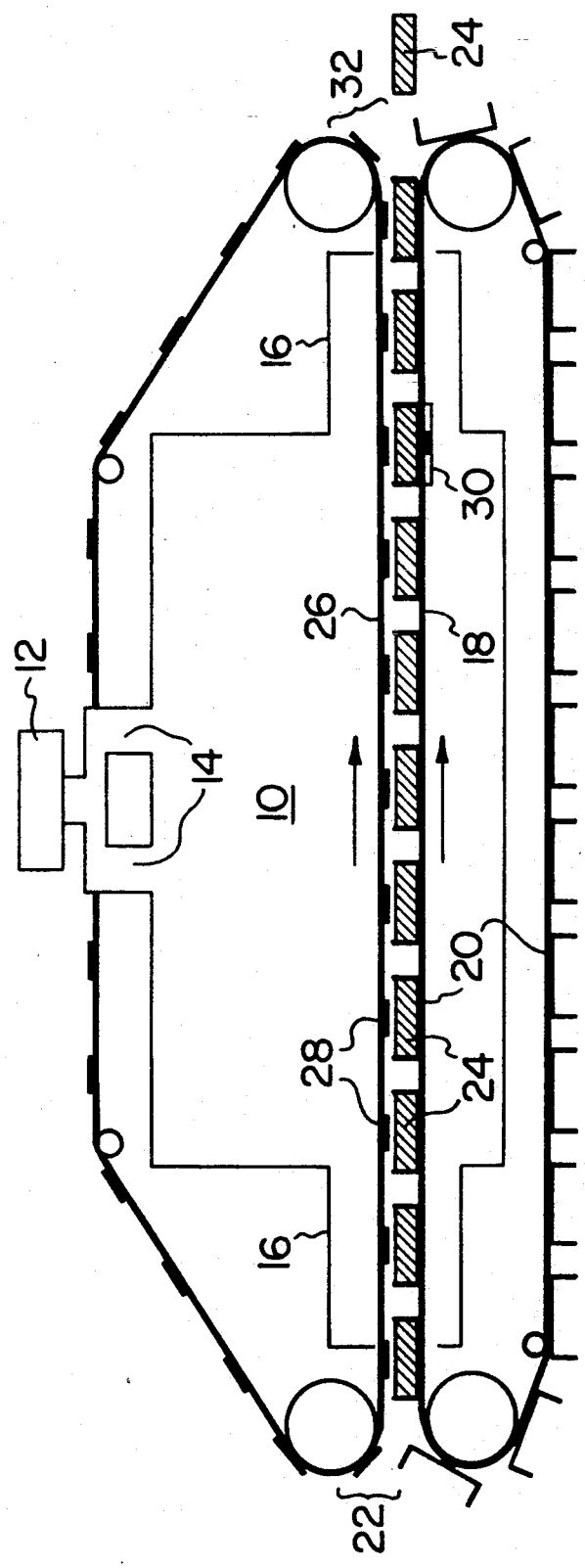
FIG. 1 is a diagrammatic representation of a first embodiment of the invention.

FIG. 1 shows a microwave tunnel oven 10 with a microwave source 12, waveguide feeds 14, microwave chokes 16, and a main microwave-transparent conveyor 18, all shown diagrammatically, since these parts are known in the art.

In accordance with this first embodiment of the invention, however, the conveyor 18 is modified by having package carriers 20 located along it at selected intervals. Each of these carriers 20 receives from a feeder mechanism (not shown) at an input end 22 of the oven a package 24 containing a food load, and conveys such package to an output end 32.

A subsidiary, microwave-transparent conveyor 26 is arranged to travel parallel and adjacent to, and in unison with, the main conveyor 18, the conveyor 26 being fitted with elements 28 spaced longitudinally at the same intervals as the carriers 20, so that, as each package 24 travels through the oven 10, it is subjected to the combined effect of the carriers 20 and the elements 28.

Figure 2A:
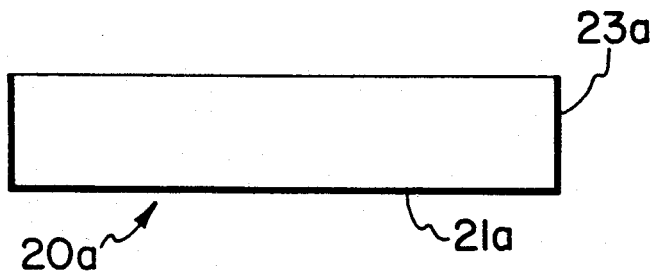
FIGS. 2a, 2b and 2c are examples of alternative constructions for elements that form part of the embodiment of FIG. 1.
Figure 2B:
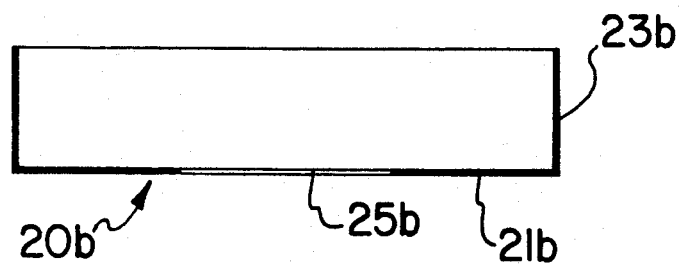
Figure 2C:
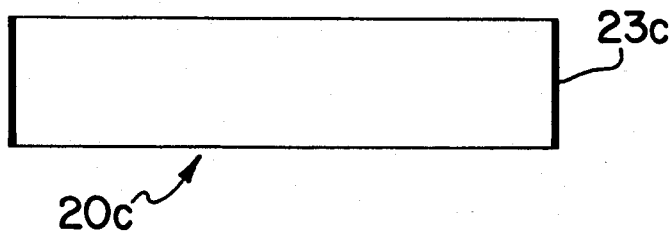

FIGS. 2a–c show examples of carriers 20. In FIG. 2a the carrier, here designated 20a, has both its bottom 21a and its side walls 23a made of metal, i.e. it is microwave-opaque except at its upper surface. In FIG. 2b the carrier 20b has metal side walls 23b and a bottom 21b, the perimeter of which is of metal, but the center of which is provided with a microwave-transparent window 25b. The carrier 20c shown in FIG. 2c consists of a ring of metal to form the side walls 23c, and an open bottom. Many other, unillustrated constructions are possible for each carrier 20, such as a wholly microwave-transparent carrier, a microwave-transparent carrier with a central metallic island, or one of the more complex structures using arrays of metallic islands or of gaps in metallic panels disclosed in the patents and applications referred to above.

In the example illustrated, the elements 28, in order to cooperate with a selected one of these carriers 20, each consists of a piece of foil or other metallic or microwave-opaque material that is positioned by synchronization of the two conveyors immediated above and centrally of the package 24 in each carrier 20. As the structure of the carriers 20 can be varied, so can the complementary structure of the elements 28. Specifically, instead of a single piece of foil, each element 28 can be a window in a surround of foil, an array of such pieces of foil or of windows, or one of the more complex construction, such as those using parts of different electric thickness, disclosed in the patents and applications referred to above.

The packages 24 may be of any convenient shape, such as circular, elliptical or rectangular, and the shapes of the carriers 20 and of the elements 28 will preferably conform to the shape of the packages, both for the purpose of conveying the packages 24 through the oven 10 without permitting relative movement between the packages and the conveyors, and also to ensure that they act together to constitute effective field modifying means.

The carriers 20 need not necessarily provide side walls surrounding the side walls of the packet 24, provided that each carrier constitutes some means for receiving and retaining a package at a predetermined registration location on the conveyor. While full side walls such as the walls 23a serve this purpose well, it can also be served by some equivalent means, such as a shallow cavity in the conveyor 18, or upstanding ridges on the conveyor 18. If the package is of one of the types shown in the U.S. Pat. No. 4,831,224 referred to above, in which the higher order mode generating means takes the form of an inward protrusion in the bottom of the container, and this is accompanied by a cavity in the outer surface of the container bottom, the carrier means on the conveyor can consist of an upward projection that registers with such cavity. If, in such a case, i.e., when the carrier means does not include side walls for the package, and the nature of the package is such that it requires microwave-opaque side walls in order to achieve the most desired field modification effect, such side walls either can be part of the package itself (see the FIG. 3 embodiment described below) or can be provided on the subsidiary conveyor 26 as depending walls that embrace the packet. In the FIG. 1 embodiment, the two conveyors 18 and 26 can be considered collectively as constituting conveyor means, it being only a matter of practical convenience which of the two conveyors provides which part or parts of the field modifying means, and which of the two conveyors provides the carrier means that ensures travel of the package through the oven at an orientation in which the load is properly in register with the field modifying means, such orientation being ensured by one or other or both of the conveyors 18 and 26 that make up the "conveyor means."

Other variations are possible. For example, each element 28 need not necessarily be located centrally of a package 24, either longitudinally or transversely of the conveyor direction. Should the package be a compartmentalized one, the contents of one compartment may require different heating from the contents of another compartment.

Moreover, although exactly synchronous travel of the two conveyors will be the normal requirement, the conveyor 26 could be arranged to travel slightly faster or slower than the conveyor 18 so that the complementary relationship between the elements 28 and the carriers 20, as far as modifying the microwave field in the packages 24 is concerned, would gradually change as the products pass through the oven.

Figure 3:
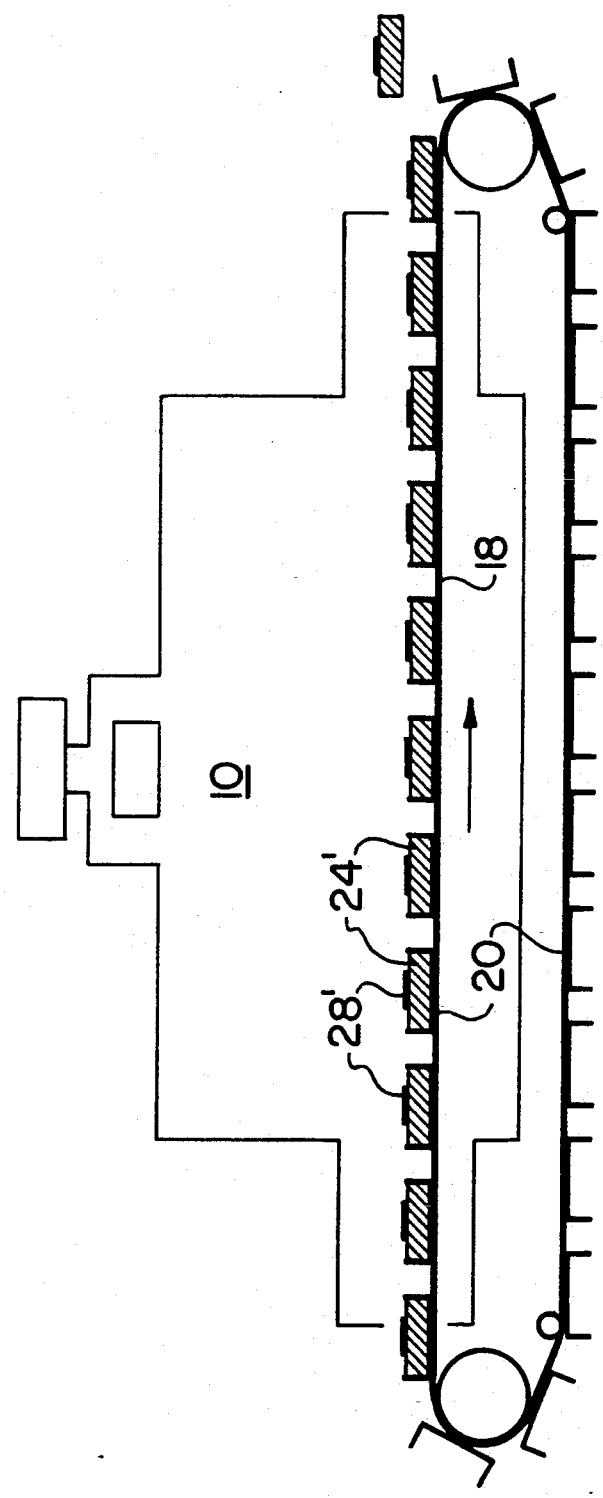
FIG. 3 is a view similar to FIG. 1 of a second embodiment of the invention.

In the embodiment of FIG. 3, the subsidiary conveyor has been dispensed with, and the packages 24' have been provided with elements 28' that function in the same way as the elements 28 to cooperate electrically with the carriers 20 to achieve the desired field modification effect. As in FIG. 1, the carriers 20 of FIG. 3 can take one of many possible forms, including those shown in FIGS. 2a-2c and the others mentioned above. In a like manner, the elements 28' shown in FIG. 3 as single pieces of metal foil can take one of the alternative forms mentioned above in respect of the elements 28.

A feature of the FIG. 3 arrangement is that, since the packages 24' contain at least a part of the field modification means, they may enable improved subsequent heating by consumers in domestic microwave ovens. The FIG. 3 arrangement thus enables variations in which the package-carried part of the field modifying means can be designed to optimize the effectiveness of the package when heated by the consumer, while the combination of this package-carried part and the part of the field modifying means provided by the carrier 20 can be designed to optimize the effectiveness of this combination when the package is in the oven 10. The FIG. 3 embodiment is thus open, not only to the numerous variations in the nature of the field modifying means discussed above, but also to a choice of which parts of the field modifying means and how many of them are carried by the package or are embodied in the conveyor or conveyors. These choices are particularly advantageous in facilitating tailoring of the system, or readily modifying the system, to optimize its performance with respect to specific products that place different demands on the system.

In both the FIGS. 1 and 3 embodiments the part of the field modifying means embodied in the carriers 20 is located on or above the upper surface of the conveyor 18. However, if it is desired to take advantage of the technology disclosed in B. C. Hewitt et al U.S. patent application Ser. No. 07/518,324 filed May 4, 1990, which achieves improvements in the uniformity of heating of certain types of food loads by shielding most of (and preferably the entire) top and side surfaces of a package from the microwave energy, so that the majority, if not all, of the energy enters the load from the bottom, while spacing the bottom surface of the load from higher order mode generating means by a distance that can be optimized to the conditions, but is at least a distance in millimeters equal to three divided by the square root of the dielectric constant of the intervening material, the part of the field modifying means carried by the conveyor 18 can be moved from its upper surface to its underside or otherwise given the necessary spacing from the package. This is shown diagrammatically at 30 in FIG. 1 beneath one carrier 20, although, if adopted, this structure would be used beneath each carrier. It would be necessary for the location of the element 30 and the thickness and dielectric constant of the conveyor 18 together to meet the distance criterion explained above. The partial or complete shielding of the tops and sides of the packages can then be provided either by structure on the packages 24 themselves, or by the structure of the carriers 20, or by structure on the subsidiary conveyor 26, or by some combination of these structures.

In some prior art machines designed to heat different products for different lengths of time in a compartmentalized container, it has been necessary to resort to devices for moving waveguides towards and away from the container, and/or to switch the microwave source. Moreover, such machines will only function with containers in which the compartments are serially arranged with the dividers between compartments extending transverse to the direction of travel, in order that at any one time all of one compartment and only such compartment is in position to be irradiated at the chosen strength for the chosen period of time. In the present arrangements, however, no such complications in the structure of the oven, or limitations in the structure of the container, are necessary. It is possible, for example, to use containers of the type in which the respective products are arranged in compartments of triangular shape, in which the dividers are oblique to the direction of travel through the oven, since the heating discrimination between products is achieved by tailoring the nature, shape, and location of the field modifying means to the location and shape of each compartment in the container.

Not only is the uniformity of heating improved by the field modifying means, but the fact that each package is moving through the oven so that the various regions of the load are exposed at various times to the variations of field strength in the oven is also helpful in this respect.

The invention is not dependent on the frequency of the microwave energy, and can be used either with the standard frequency of 2.45 GHz, or the commercially used frequency of 915 MHz, or any other frequency suitable for microwave heating, subject to adjustment of the dimensions to suit the frequency chosen.

We claim:

1. In a microwave tunnel oven for receiving at least one package comprising a container and a load in the container, which load is to be heated by microwave energy, the oven comprising conveyor means extending through the oven, said conveyor means having carrier means for receiving the package at an input end of the oven and for conveying the package through the oven to an output end thereof and means for irradiating the package with microwave energy during its transit through the oven;
the improvement comprising means for modifying the microwave field in the load during its irradiation in a manner to generate higher order modes of microwave energy in the load to enhance the uniformity of heating throughout the load, said field modifying means being at least in part formed on the conveyor means.

2. An oven according to claim 1, wherein said field modifying means is in part formed on the package.

3. An oven according to claim 1, wherein said field modifying means is formed entirely on the conveyor means.

4. An oven according to claim 1, wherein said field modifying means is at least in part formed on the carrier means.

5. An oven according to claim 1, wherein said field modifying means is at least in part formed on the conveyor means spaced from the carrier means.

6. An oven according to claim 1, wherein the conveyor means comprises a pair of parallel conveyors for conveying the package between them, said field modifying means being formed in part on each of said conveyors.

7. In a microwave tunnel oven for receiving at least one package comprising a container and a load in the container, which load is to be heated by microwave energy, the oven comprising a main conveyor extending through the oven, said conveyor having carrier means for receiving the package at an input end of the oven and for conveying the package through the oven to an output end thereof, and means for irradiating the package with microwave energy during its transit through the oven;
the improvement comprising means for modifying the microwave field in the load during its irradiation in a manner to generate higher order modes of microwave energy in the load to enhance the uniformity of heating throughout the load, said field modifying means being divided into two parts, one such part being formed on the conveyor and the other part being formed on at least one of
(a) the package, and
(b) a subsidiary conveyor extending parallel to the main conveyor.

8. A microwave tunnel oven for receiving a series of packages each comprising a container and a load in the container, which load is to be heated by microwave energy, said oven comprising
(a) a main, microwave-transparent conveyor extending through the oven and having a longitudinally arranged series of carrier means each for receiving a said package at an input end of the oven and for conveying the package through the oven to an output end thereof,
(b) means for irradiating the packages with microwave energy during their transit through the oven,
(c) a subsidiary, microwave-transparent conveyor arranged to extend parallel to and travel with the main conveyor closely adjacent the carrier means, and
(d) means for modifying the microwave field in each load during its irradiation in a manner to generate higher order modes of microwave energy in the load to enhance the uniformity of heating throughout the load, said field modifying means being formed on at least one of the main and subsidiary conveyors at locations aligned with said load.

9. An oven according to claim 8, wherein said field modifying means is divided into two parts formed respectively on the main and subsidiary conveyors.

10. An oven according to claim 8, wherein each carrier means comprises an imperforate metallic holder for shielding from microwave energy the bottom and sides of the package conveyed by it.

11. An oven according to claim 8, wherein each carrier means comprises a metallic holder for shielding from microwave energy the sides of the package conveyed by it and for selectively shielding from microwave energy regions of the bottom of the package.

12. An oven according to claim 8, wherein each carrier means has the form of a metallic ring for shielding from microwave energy the sides of the package conveyed by it, while leaving the bottom of the package unshielded from microwave energy.

13. An oven according to claim 12, including field modifying means secured to a part of the main conveyor spaced from each carrier means.

14. An oven according to claim 8, including field modifying elements secured to the subsidiary conveyor to align with at least one selected region of an upper surface of each package.

15. The combination of a series of packages each comprising a container and a load in the container, and a microwave tunnel oven for heating the loads in said packages;
said oven comprising
(a) a main, microwave-transparent conveyor extending through the oven and having a longitudinally arranged series of carrier means each for receiving a said package at an input end of the oven and for conveying the package through the oven to an output end thereof, and
(b) means for irradiating the packages with microwave energy during their transit through the oven, and
said combination comprising
(c) means for modifying the microwave field in each load during its irradiation in a manner to generate higher order modes of microwave energy in the load to enhance the uniformity of heating throughout the load, said modifying means being formed partly on the conveyor and partly on the package.

16. The combination of claim 15, wherein each carrier means comprises in imperforate metallic holder for shielding from microwave energy the bottom and sides of the package conveyed by it.

17. The combination of claim 15, wherein each carrier means comprises a metallic holder for shielding from microwave energy the sides of the package conveyed by it and for selectively shielding from microwave energy regions of the bottom of the package.

18. The combination of claim 15, wherein each carrier means has the form of a metallic ring for shielding from microwave energy the sides of the package conveyed by it, while leaving the bottom of the package unshielded from microwave energy.

19. The combination of claim 18, including field modifying means secured to a part of the main conveyor spaced from each carrier means.

* * * * *